(12) United States Patent
Ito et al.

(10) Patent No.: US 6,520,764 B1
(45) Date of Patent: Feb. 18, 2003

(54) MOLDING DIE FOR OPTICAL RECORDING DISK

(75) Inventors: Yoshinori Ito, Tokyo (JP); Emi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 09/585,536

(22) Filed: Jun. 2, 2000

(30) Foreign Application Priority Data

Jun. 3, 1999 (JP) ............................................. 11-156373

(51) Int. Cl.[7] .............................................. B29C 45/73
(52) U.S. Cl. ...................... 425/547; 264/106; 264/107; 264/328.16; 425/810
(58) Field of Search ................................ 425/810, 547; 264/106, 107, 328.16

(56) References Cited

U.S. PATENT DOCUMENTS 5,324,473 A * 6/1994 Baresich ................. 264/328.16
5,893,998 A * 4/1999 Kelley et al. ................ 425/810

* cited by examiner

Primary Examiner—Tim Heitbrink
(74) Attorney, Agent, or Firm—Sonnenschein, Nath & Rosenthal

(57) ABSTRACT

There is disclosed a molding die which can prevent or restrain a wedge-like deformation from being formed at an outer peripheral portion of an optical recording disk. The molding die is for molding a thin circular plate optical recording disk by injecting a molten thermosetting resin in a cavity, and an outer peripheral member coming in contact with a portion which becomes an outer peripheral surface of the optical recording disk is made of a material having a thermal conductivity lower than a thermal conductivity of a material of an opposite member coming in contact with a portion which becomes a main surface of the optical recording disk, that is, a stamper, a stationary mirror, and a movable mirror.

8 Claims, 8 Drawing Sheets

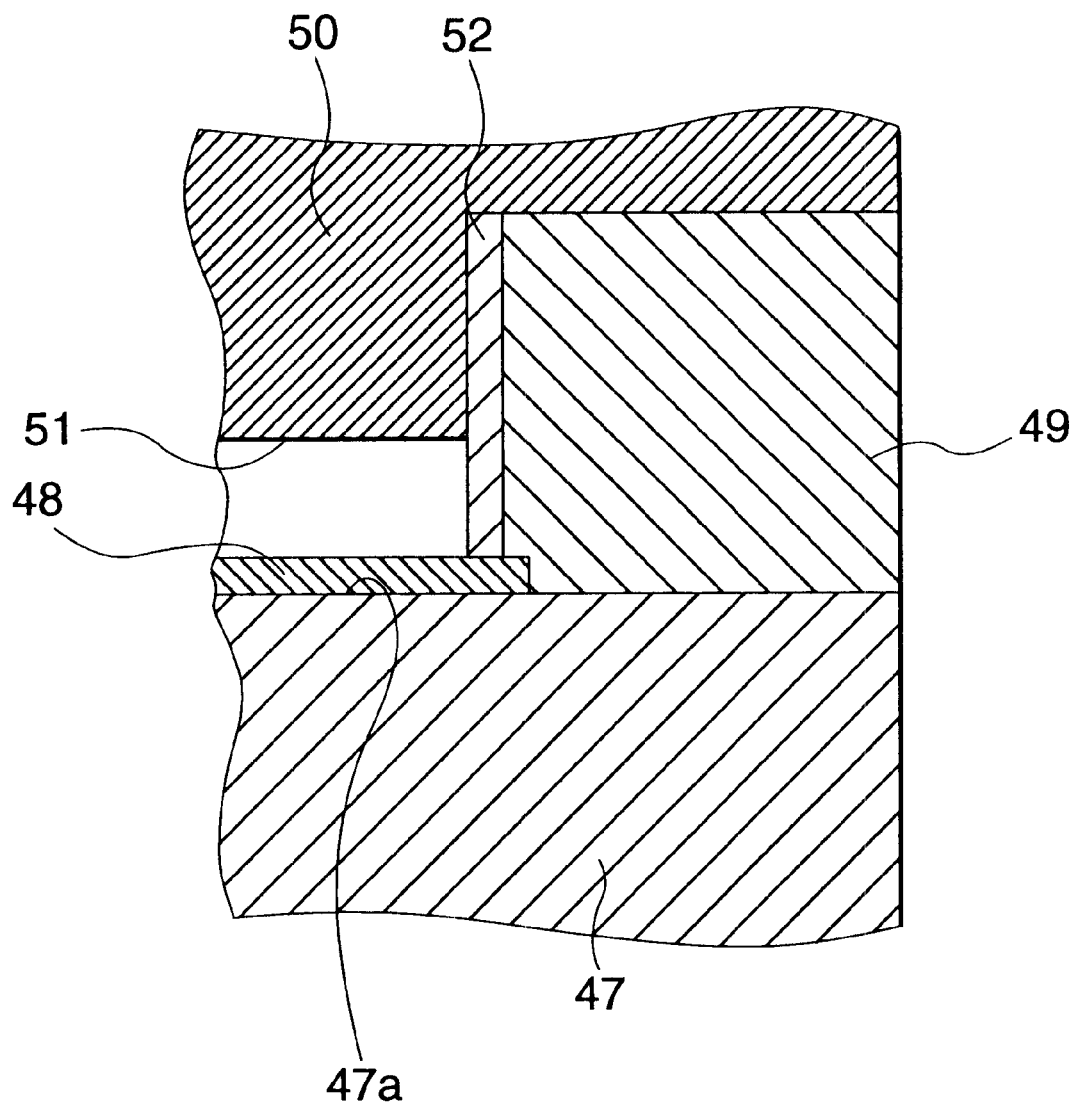

MOLDING DIE FOR OPTICAL RECORDING DISK

BACKGROUND OF THE INVENTION

1. Field of the Invention

The present invention relates to a novel molding die for an optical recording disk. Particularly, the invention relates to a technique for preventing or restraining a wedge-shaped deformation from being formed at an outer peripheral portion of an optical recording disk.

2. Description of the Related Art

In general, an optical recording disk, such as a CD, CD-R, or MO, is formed by forming a substrate through injection molding of a thermosetting resin and then, by carrying out processing of formation of a reflecting layer and the like.

When the optical recording disk (substrate) "a" is injection molded, there is a problem that a wedge-like deformation "b" is formed at an outer peripheral portion (see a solid line of FIG. 2). It appears that the reason why such a deformation "b" is formed is as follows:

When a resin is cooled in a cavity of a molding die, upper and lower surfaces (main surfaces) and inner and outer peripheral surfaces are first cooled, and a shell is formed at the outside. Thereafter, as the inside is cooled, contraction continues, and plate thickness is decreased at portions except for the outer peripheral portion. At the outer peripheral portion, the previously formed shell resists in the upper and lower directions, so that the portion does not contract, or even if it contracts, the contraction is merely slight. Thus, when its section is seen, only the outer periphery is widened and comes to have a shape like a wedge (solid line in FIG. 2).

There is a problem that when the foregoing wedge-shaped deformation is formed on the optical recording disk, a recording region can not be widened to a position close to the outer periphery.

SUMMARY OF THE INVENTION

An object of the present invention is therefore to prevent or restrain a wedge-shaped deformation from being formed at an outer peripheral portion of an optical recording disk.

In order to achieve the above object, in a molding die for an optical recording disk according to the invention, a cooling rate of an outer peripheral member coming in contact with a portion of the optical recording disk which becomes an outer peripheral surface is made slower than a cooling rate of an opposite member coming in contact with a portion of the optical recording disk which becomes a main surface.

Thus, in the molding die for the optical recording disk according to the invention, since a cooling rate of a portion of an injected molten resin coming in contact with the outer peripheral member, that is, a portion which becomes the outer peripheral surface of the optical recording disk becomes slower than a cooling rate of a portion coming in contact with the opposite member, formation of a shell at the outer peripheral portion becomes slower than that at the main surface portion. Thus, a wedge-shaped deformation is not formed or even if the deformation is formed, it becomes small.

BRIEF DESCRIPTION OF THE DRAWINGS

FIG. 8 is a sectional view of a main portion showing a modified example of a structure of an outer peripheral portion of a cavity in the case where an outer peripheral member is made one having a slow cooling rate in structure.

DETAILED DESCRIPTION OF THE PREFERRED EMBODIMENTS

Hereinafter, embodiments of a molding die for an optical recording disk according to the invention will be described with reference to the accompanying drawings.

Figure 1:
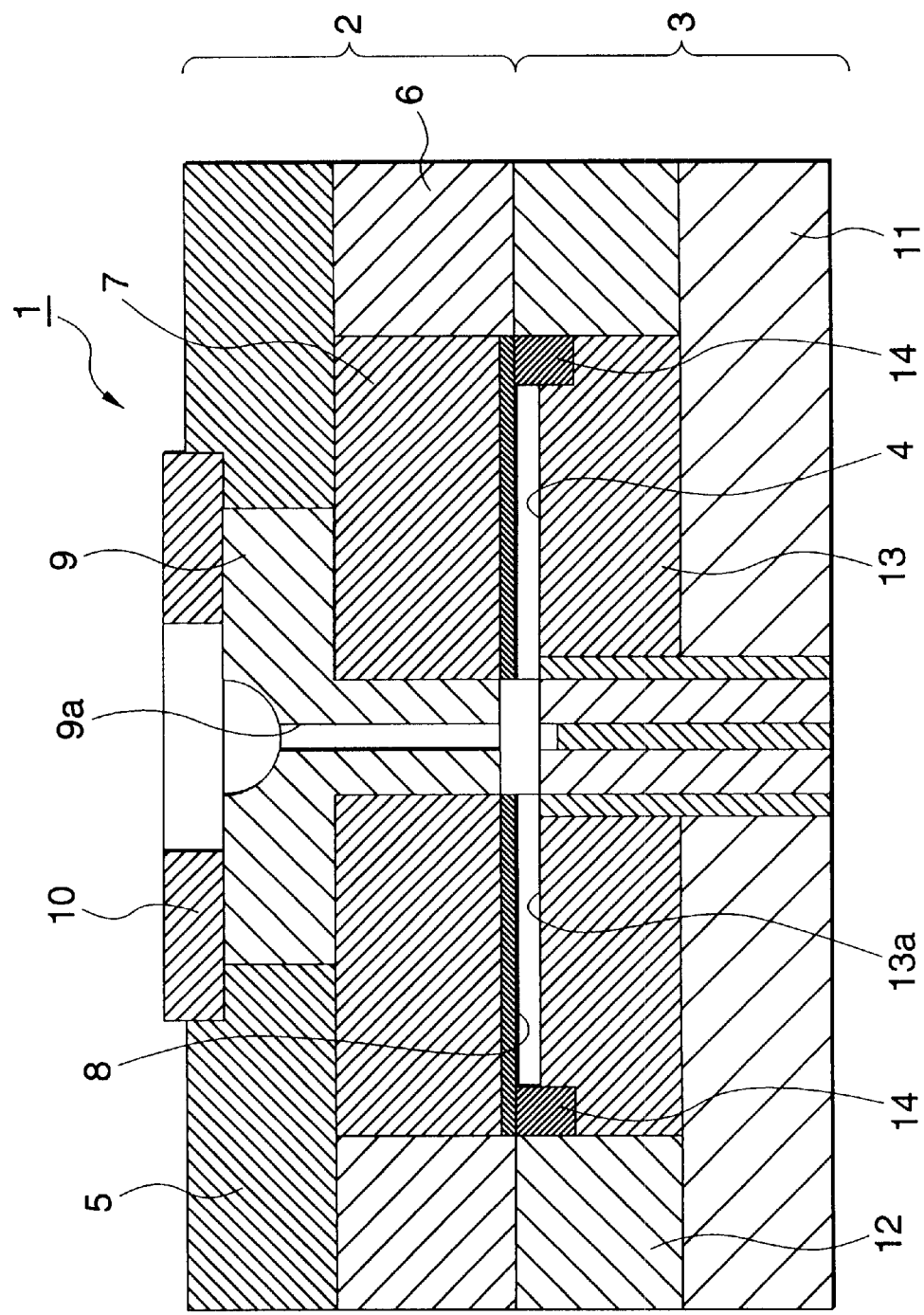
FIG. 1 shows an embodiment of a molding die for an optical recording disk according to the invention and is a schematic longitudinal sectional view of the molding die.

FIG. 1 shows an outline of a molding die 1 for an optical recording disk.

The molding die 1 includes a movable die part 3 detached from or attached to a stationary die part 2. A cavity 4 for injection of a molten resin which becomes a substrate of an optical recording disk, is formed in a state where the movable die part 3 is clamped to the stationary die part 2.

The stationary die part 2 includes a stationary attachment plate 5 shaped into a disk having a hole in its center. An annular stamper holding ring 6 and a stationary mirror 7 fitted in the stamper holding ring 6 are fixed to the lower surface of the stationary attachment plate 5. The thickness of the stationary mirror 7 is made slightly smaller than the thickness of the stamper holding ring 6, so that a disk-shaped recess portion is formed at the lower surfaces of these. A stamper 8 on which a roughened shape to be transferred to a molding is fitted and held in the recess portion. A spool bushing 9 having a through hole 9a is fitted in the center portion of the stationary attachment plate 5 and the stationary mirror 7. A bushing holder 10 is fixed to the upper end of the stationary attachment plate 5 so as to cover the spool bushing 9.

The movable die part 3 includes a movable attachment plate 11 shaped into a disk having a hole in its center portion. An annular ring member 12 and a movable mirror 13 fitted in the ring member 12 are fixed to the upper surface of the movable attachment plate 11. A cavity ring 14 is attached at an upper end of an outer peripheral portion of the movable mirror 13 and between the movable mirror and the ring member 12. The thickness of the movable mirror 13 is made slightly smaller than the thickness of the ring member 12, and the upper end surface of the cavity ring 14 is made positioned at the same plane as the upper end surface of the ring member 12, so that a shallow recess portion surrounded by the upper surface of the movable mirror 13 and the inner peripheral surface of the cavity ring 14 is formed.

When the stationary die part 2 and the movable die part 3 are pressed, that is, are clamped, the cavity 4 is formed by the lower surface of the stamper 8, the inner peripheral surface of the cavity ring 14, and the upper surface of the movable mirror 13, that is, a mirror surface 13a.

Then, a molten thermosetting resin is injected in the cavity 4 through the through hole 9a of the spool bushing 9. By this, a substrate of an optical recording disk having the same shape as the cavity 4 can be made from the thermosetting resin injected by a predetermined pressure. Pits expressing information by a roughened shape of the stamper 8, grooves for guiding a pickup, or the like are formed on a surface of the substrate which has been brought into contact with the stamper 8.

In the molding die 1, a member for defining the outer periphery of the cavity 4, that is, the cavity ring 14 as an outer peripheral member coming in contact with a portion which becomes an outer peripheral surface of an optical recording disk is made of a member having a cooling rate slower than a member for defining the upper and lower surfaces of the cavity 4, that is, the stamper 8 as the opposite member coming in contact with a portion which becomes the main surface of the optical recording disk, the stationary mirror 7, and the movable mirror 13.

Figure 2:
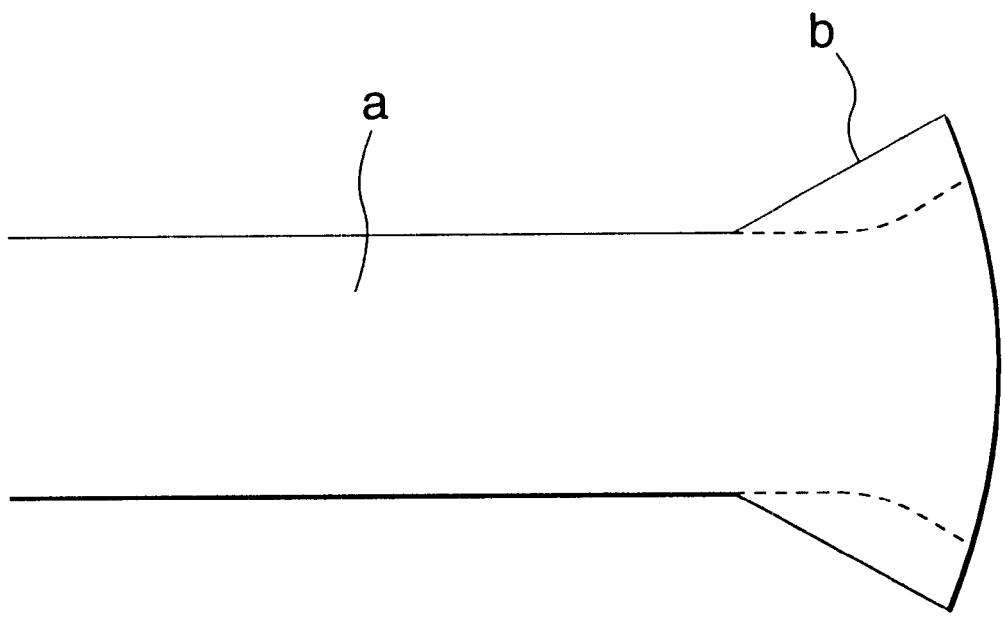
FIG. 2 is an enlarged sectional view showing an outer peripheral portion of a substrate of an optical recording disk, in which a solid line shows a conventional one, and a broken line shows one molded through the molding die of the invention.

Thus, a temperature gradient of resin injected in the cavity 4 at the cooling time of its outer peripheral portion becomes gentler than a temperature gradient at the cooling time of its upper and lower portions. Thus, a wedge-shaped deformation is not formed at the outer peripheral portion of a molding (substrate of the optical recording disk), or even if the deformation is formed, as shown by the broken line in FIG. 2, the deformation becomes very small.

As means for causing the cavity ring 14 to be the member having the slow cooling rate, it is conceivable to make the cavity ring 14 from a material having a thermal conductivity lower than a material of the stamper 8, and the mirrors 7 and 13. It is suitable that such a material has a thermal conductivity lower than the material of the stamper 8 and the mirrors 7 and 13 by two digits or preferably three digits or more, and as such a material, ceramic such as zirconia can be mentioned.

The die structure is not limited to that shown in FIG. 1, but various forms are conceivable, and part of those are shown in FIGS. 3 to 6.

Figure 3:
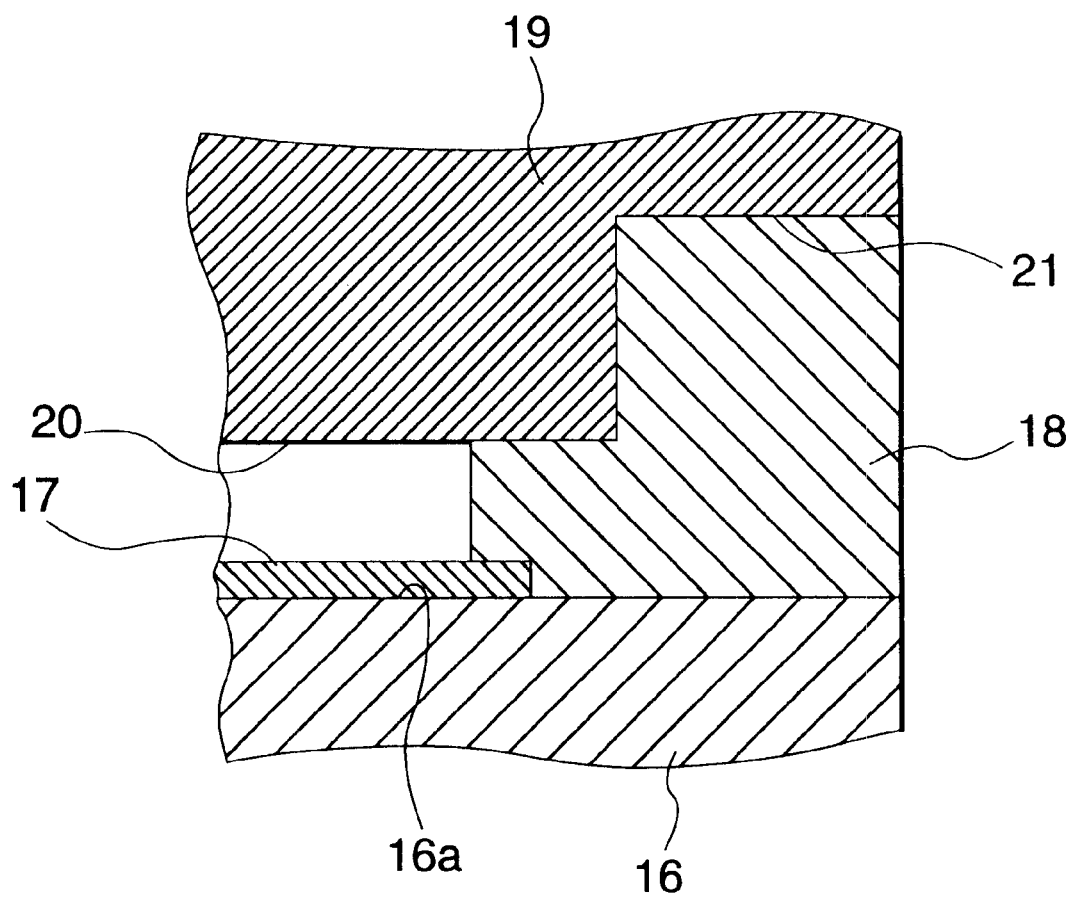
FIG. 3 is a sectional view of a main portion showing a modified example of a structure of an outer peripheral portion of a cavity in the case where a material having a low thermal conductivity is used as an outer peripheral member.

FIG. 3 shows a structure in which a stamper 17 is attached to a mirror surface 16a of a stationary mirror 16, an outer peripheral portion of the stamper 17 is pressed by an outer peripheral member 18 fixed to the stationary mirror 16, and a cavity 20 is formed of the stamper 17, the outer peripheral member 18, and a movable mirror 19. A stationary die part and a movable die part are separated by a parting line 21. A material having a low thermal conductivity is used for the outer peripheral member 18.

Figure 4:
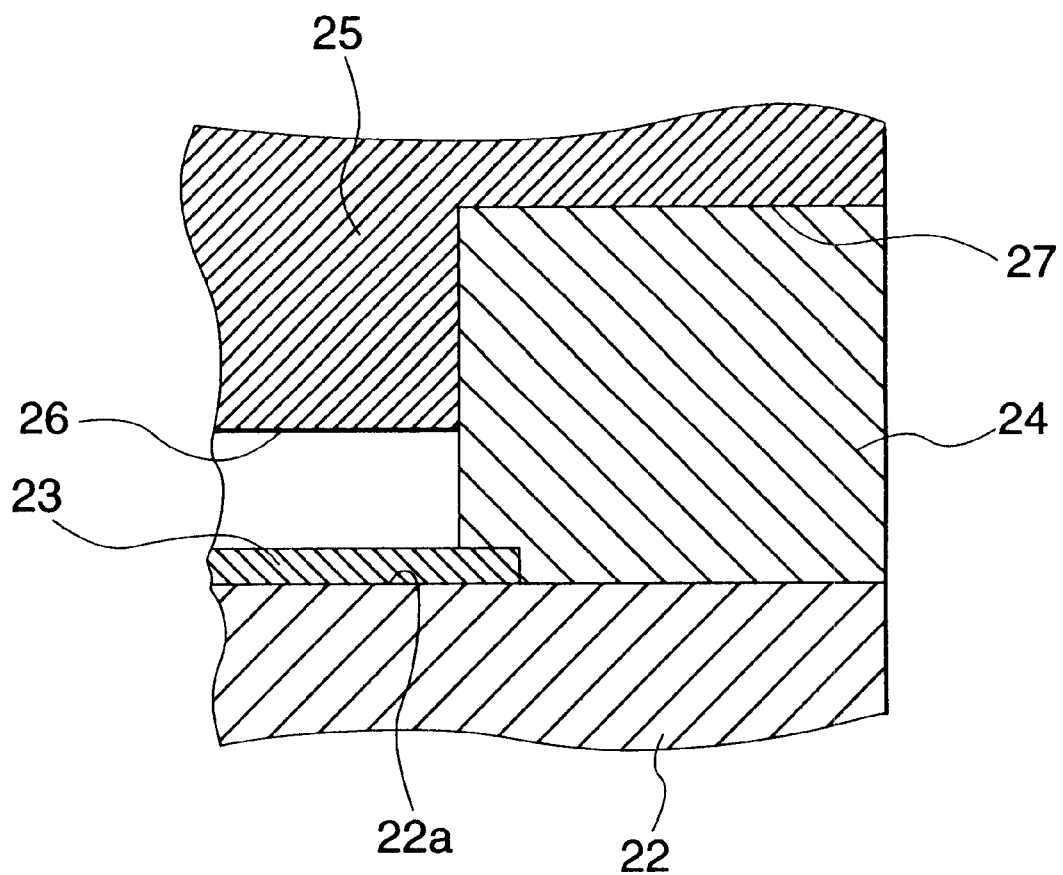
FIG. 4 is a sectional view of a main portion showing another modified example of a structure of an outer peripheral portion of a cavity in the case where a material having a low thermal conductivity is used as an outer peripheral member.

FIG. 4 also shows a structure in which a stamper 23 is attached to a mirror surface 22a of a stationary mirror 22, an outer peripheral portion of the stamper 23 is pressed by an outer peripheral member 24 fixed to the stationary mirror 22, and a cavity 26 is formed of the stamper 23, the outer peripheral member 24, and a movable mirror 25. A stationary die part and a movable die part are separated by a parting line 27. A material having a low thermal conductivity is used for the outer peripheral member 24. The difference between FIG. 3 and FIG. 4 is that in FIG. 3, a surface of the movable mirror 19 defining one of main surfaces of the cavity 20 partially intrudes into the outer peripheral member 18, while in FIG. 4, a surface of the outer peripheral member 24 defining an outer peripheral surface of the cavity 26 partially intrudes into the movable mirror 25.

Figure 5:
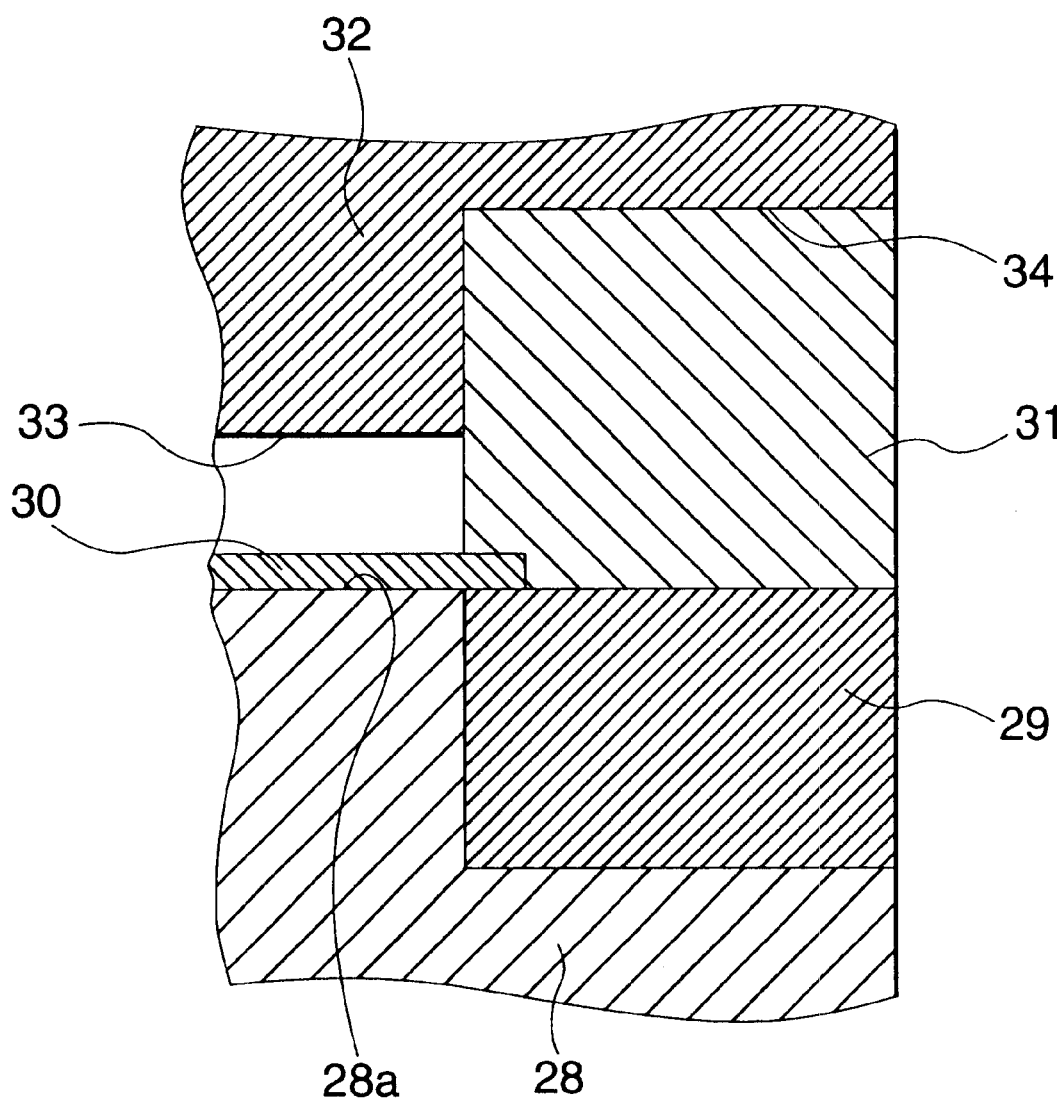
FIG. 5 is a sectional view of a main portion showing still another modified example of a structure of an outer peripheral portion of a cavity in the case where a material having a low thermal conductivity is used as an outer peripheral member.

FIG. 5 shows a structure in which a first outer peripheral member 29 is provided side by side at an outer peripheral side of a stationary mirror 28, a stamper 30 is fixed to a mirror surface 28a of the stationary mirror 28, an outer peripheral portion of the stamper 30 slightly protruding to the first outer peripheral member 29 is pressed by a second outer peripheral member 31 fixed to the first outer peripheral member 29, and a cavity 33 is formed of the stamper 30, the second outer peripheral member 31, and a movable mirror 32. A stationary die part and a movable die part are separated by a parting line 34. A material having a low thermal conductivity is used for the first and second outer peripheral members 29 and 31.

Figure 6:
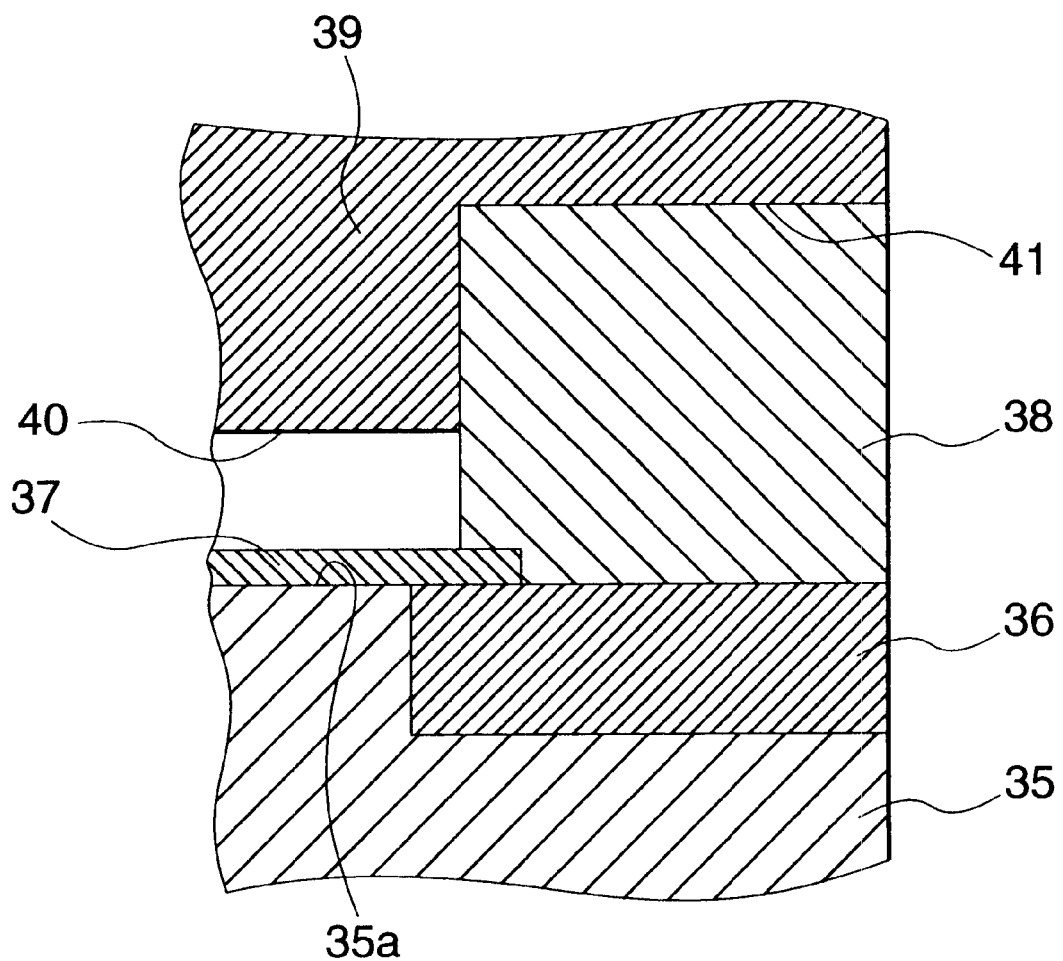
FIG. 6 is a sectional view of a main portion showing still another modified example of a structure of an outer peripheral portion of a cavity in the case where a material having a low thermal conductivity is used as an outer peripheral member.

FIG. 6 also shows a structure in which a first outer peripheral member 36 is provided side by side at an outer peripheral side of a stationary mirror 35, a stamper 37 is fixed to a mirror surface 35a of the stationary mirror 35, an outer peripheral portion of the stamper 37 slightly protruding to the first outer peripheral member 36 is pressed by a second outer peripheral member 38 fixed to the first outer peripheral member 36, and a cavity 40 is formed of the stamper 37, the second outer peripheral member 38, and a movable mirror 39. A stationary die part and a movable die part are separated by a parting line 41. A material having a low thermal conductivity is used for the first and second outer peripheral members 36 and 38. The difference between FIG. 5 and FIG. 6 is that in FIG. 5, a contact surface of the stationary mirror 28 and the first outer peripheral member 29 is the same surface as a surface of the second outer peripheral member 31 defining an outer periphery of the cavity 33, while in FIG. 6, a contact surface of the stationary mirror 35 and the first outer peripheral member 36 is in a state where it slightly intrudes to the side of the cavity 40.

In any of the structures shown in FIGS. 1 and 3 to 6, although one surface of the cavity is defined by the stamper, the stamper is not an indispensable element. For example, a roughened shape needed to form pits or grooves may be directly formed on the mirror surface of the stationary mirror.

Besides, although ceramic is mentioned as an example of a material having a low thermal conductivity, the invention is not limited to this. For example, some kind of resin can be used.

Besides, means for slowing the cooling rate of an outer peripheral member is not limited to the use of a material having a low thermal conductivity for the outer peripheral portion.

Figure 7:
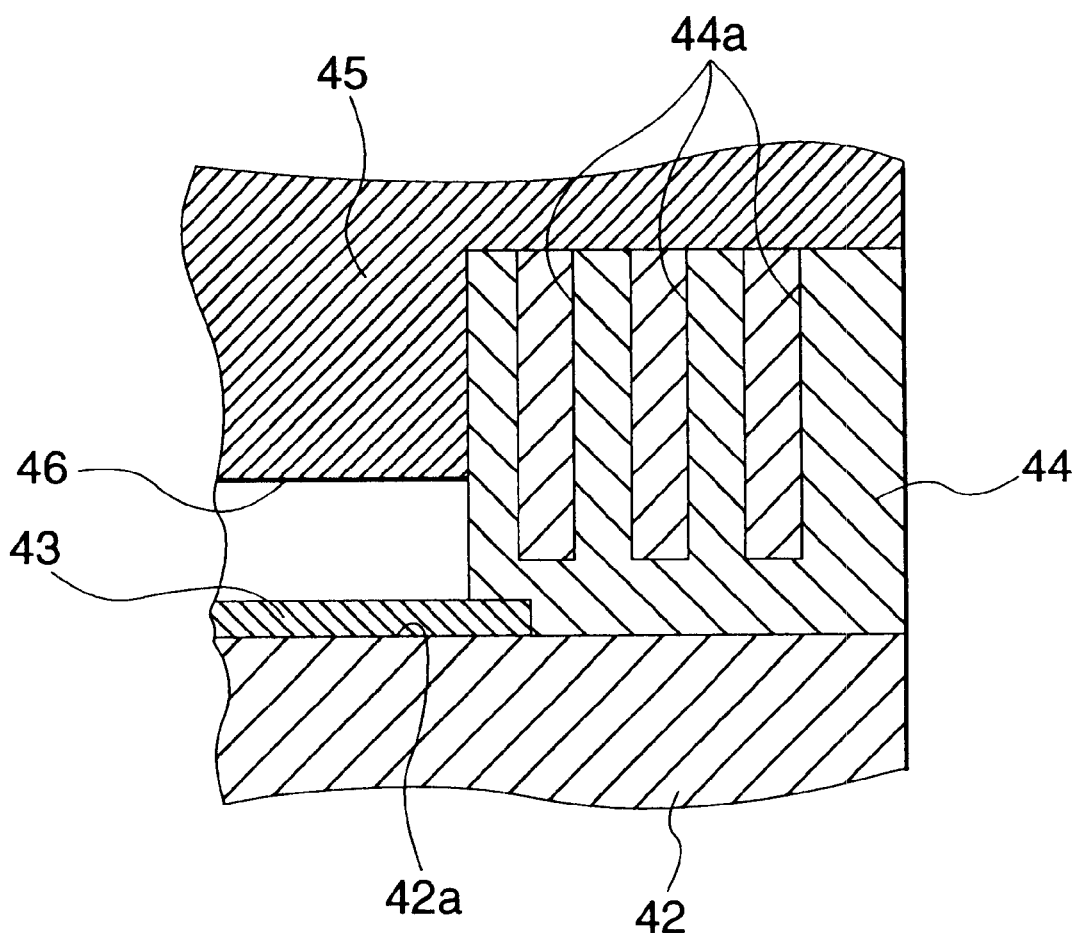
FIG. 7 is a sectional view of a main portion showing a structure of an outer peripheral portion of a cavity in the case where an outer peripheral member is made one having a slow cooling rate in structure.

For example, as shown in FIG. 7, an outer peripheral member 44, which presses an outer peripheral portion of a stamper 43 attached to a mirror surface 42a of a stationary mirror 42 against the stationary mirror 42, is made porous by forming a plurality of holes 44a, 44a, . . . to slow a cooling rate of the outer peripheral member 44, and a cavity 46 may be formed of the outer peripheral member 44, the stamper 43, and a movable mirror 45. Besides, as shown in FIG. 8, an outer peripheral member 49, which presses an outer peripheral portion of a stamper 48 attached to a mirror surface 47a of a stationary mirror 47 against the stationary mirror 47, is made of the same material as the stationary mirror 47 and the movable mirror 50, and a material 52 having a low thermal conductivity may be coated on a surface of the outer peripheral member 49 defining an outer periphery of a cavity 51.

Incidentally, the shape and structure of each portion in the respective embodiments described above is merely an example of embodying the invention, and the technical range of the invention should not be restrictively interpreted by these.

As is apparent from the above description, a molding die for an optical recording disk according to the invention is a molding die for molding a thin circular plate optical recording disk by injecting a molten thermosetting resin in a cavity, and is characterized in that a cooling rate of an outer peripheral member coming in contact with a portion which becomes an outer peripheral surface of the optical recording disk is made slower than a cooling rate of an opposite member coming in contact with a portion which becomes a main surface of the optical recording disk.

Thus, in the molding die for the optical recording disk according to the invention, since a cooling rate of a portion of the injected molten resin coming in contact with the outer peripheral member, that is, a cooling rate of the portion of the optical recording disk which becomes the outer peripheral surface becomes slower than a cooling rate of a portion coming in contact with the opposite member, formation of a shell at the outer peripheral portion becomes slower than the main surface, and therefore, a wedge-like deformation is not formed, or even if the deformation is formed, it becomes small.

According to a second aspect of the invention, since the outer peripheral member is made of a material having a low thermal conductivity, the outer peripheral member can be easily made one having a low cooling rate.

According to a third aspect of the invention, since the material having the low thermal conductivity is made ceramic, a difference in cooling rate between the opposite member and the outer peripheral member can be made large.

What is claimed is:

1. A molding die for molding a thin circular plate optical recording disk by injecting a molten thermosetting resin in a cavity, the molding die comprising:

a stationary mirror, said stationary mirror having a lower surface;

a stamper, said stamper having an upper surface and a lower surface, the upper surface of said stamper being contiguous with the lower surface of said stationary mirror;

an outer peripheral member, said outer peripheral member having an upper surface, a lower surface and a side surface, the upper surface of said outer peripheral member being contiguous with a second portion of the lower surface of said stamper;

a movable mirror, said movable mirror having a first upper surface, a second upper surface and a first side surface, wherein the lower surface of said outer peripheral member is contiguous with the second upper surface of said movable mirror and a second portion of the side surface of said outer peripheral member is contiguous with the first side surface of said movable mirror, and said cavity is formed between a first portion of the lower surface of said stamper, a first portion of the side surface of said outer peripheral member, and the first upper surface of said movable mirror, and a cooling rate of said outer peripheral member coming in contact with a portion which becomes an outer peripheral surface of the optical recording disk is slower than a cooling rate of the first portion of the lower surface of said stamper and the first upper surface of said movable mirror, both of which come in contact with portions that become main surfaces of the optical recording disk.

2. A molding die for an optical recording disk according to claim 1, wherein said outer peripheral member is made of a material having a thermal conductivity lower than the first portion of the lower surface of said stamper and the first upper surface of said movable mirror.

3. A molding die for an optical recording disk according to claim 2, wherein the material of said outer peripheral member is ceramic.

4. A molding die according to claim 1, wherein a side surface of said stamper is contiguous with at least a portion of the first side surface of said outer peripheral member.

5. A molding die according to claim 4, wherein a first portion of the lower surface of said outer peripheral member is contiguous with the upper surface of said movable mirror at a different depth than the depth at which a second portion of the lower surface of said outer peripheral member is contiguous with the upper surface of said movable mirror.

6. A molding according to claim 4, further comprising a second outer peripheral member, said second peripheral member having an upper surface, a lower surface and a side surface, wherein:

at least a portion of the lower surface of said second outer peripheral member is contiguous with at least a portion of the upper surface of said outer peripheral member, and wherein the side surface of said second outer peripheral member is contiguous with a side surface of said stationary mirror, and wherein the upper surface of said second outer peripheral member is contiguous with at least a portion of a lower surface of said stationary mirror.

7. A molding die according to claim 4, wherein said outer peripheral member comprises one or more holes for altering its thermal flow characteristics.

8. A molding die according to claim 4, wherein said outer peripheral member comprises a separate layer of material with a low thermal conductivity.

* * * * *